United States Patent
Chen

(10) Patent No.: US 11,489,640 B2
(45) Date of Patent: Nov. 1, 2022

(54) DEVICE AND METHOD OF PERFORMING RECEPTION AND TRANSMISSION OF WLAN SIGNALS

(71) Applicant: Realtek Semiconductor Corp., HsinChu (TW)

(72) Inventor: Yen-Ting Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/385,829

(22) Filed: Jul. 26, 2021

(65) Prior Publication Data

US 2022/0200747 A1 Jun. 23, 2022

(30) Foreign Application Priority Data

Dec. 17, 2020 (TW) .................................. 109144769

(51) Int. Cl.
*H04L 5/00* (2006.01)
*H04L 1/00* (2006.01)
*H04W 84/12* (2009.01)

(52) U.S. Cl.
CPC .......... *H04L 5/0044* (2013.01); *H04L 1/0008* (2013.01); *H04L 1/0061* (2013.01); *H04W 84/12* (2013.01)

(58) Field of Classification Search
CPC ... H04L 5/0044; H04L 1/0008; H04L 1/0061; H04W 84/12
See application file for complete search history.

(56) References Cited

U.S. PATENT DOCUMENTS

| 7,301,926 | B1 * | 11/2007 | Dietrich | H04W 24/08 370/332 |
|---|---|---|---|---|
| 8,040,861 | B2 | 10/2011 | Calhoun | |
| 9,036,640 | B2 | 5/2015 | Hu | |
| 2005/0030946 | A1 | 2/2005 | Carty | |
| 2014/0195630 | A1 * | 7/2014 | Malik | G06F 13/28 709/212 |
| 2015/0282026 | A1 | 10/2015 | Gupta | |
| 2020/0067832 | A1 | 2/2020 | Miu | |

FOREIGN PATENT DOCUMENTS

| EP | 0917318 A2 | 5/1999 |
|---|---|---|
| TW | 201739285 A | 11/2017 |

* cited by examiner

*Primary Examiner* — Jamal Javaid
(74) *Attorney, Agent, or Firm* — Winston Hsu

(57) ABSTRACT

A reception-transmission device includes a first interface circuit, for transforming at least one first WLAN signal to at least one first Ethernet frame when receiving the at least one first WLAN signal, and for transforming at least one second Ethernet frame to at least one second WLAN signal when receiving the at least one second Ethernet frame. The reception-transmission device includes a reception-transmission circuit, coupled to the first interface circuit, for transmitting the at least one first WLAN signal to the first interface circuit when receiving the at least one first WLAN signal, and for transmitting the at least one second WLAN signal to a WLAN when receiving the at least one second WLAN signal.

20 Claims, 6 Drawing Sheets

DEVICE AND METHOD OF PERFORMING RECEPTION AND TRANSMISSION OF WLAN SIGNALS

BACKGROUND OF THE INVENTION

1. Field of the Invention

The present invention relates to a device and a method used in a communication system, and more particularly, to a device and a method of performing reception and transmission of WLAN signals.

2. Description of the Prior Art

In a communication system, a Wireless Local Area Network (WLAN) Network Interface Controller (WLAN NIC) may connect to a host system including a specific transmission interface via a specific transmission interface of the WLAN NIC, to transmit WLAN signals to the host system. However, the WLAN NIC cannot connect to the host system normally, when the host system does not include the specific transmission interface. Thus, how to solve reception and transmission of the WLAN signals of the host system not including the specific transmission interface is an important problem to be solved.

SUMMARY OF THE INVENTION

The present invention therefore provides a device and a method of performing reception and transmission of WLAN signals, to solve the abovementioned problem.

A reception-transmission device, comprises an interface circuit, for performing following operations: transforming at least one first Wireless Local Area Network (WLAN) signal to at least one first Ethernet frame and transmitting the at least one first Ethernet frame, when receiving the at least one first WLAN signal; and transforming at least one second Ethernet frame to at least one second WLAN signal and transmitting the at least one second WLAN signal, when receiving the at least one second Ethernet frame; and a reception-transmission circuit, coupled to the interface circuit, for performing following operations: transmitting the at least one first WLAN signal to the interface circuit, when receiving the at least one first WLAN signal; and transmitting the at least one second WLAN signal to a WLAN, when receiving the at least one second WLAN signal.

A processing device, comprises a processing circuit, for performing following operations: transforming at least one first Ethernet frame to at least one first Wireless Local Area Network (WLAN) signal, when receiving the at least one first Ethernet frame; and transforming at least one second WLAN signal to at least one second Ethernet frame, when obtaining the at least one second WLAN signal; and an interface circuit, coupled to the processing circuit, for performing following operations: transmitting the at least one first Ethernet frame to the processing circuit, when receiving the at least one first Ethernet frame; and transmitting the at least one second Ethernet frame to a reception-transmission device, when receiving the at least one second Ethernet frame.

A computing device, comprises a reception-transmission circuit, for performing following operations: transmitting at least one first Wireless Local Area Network (WLAN) signal, when receiving the at least one first WLAN signal; and transmitting at least one second WLAN signal to a WLAN, when receiving the at least one second WLAN signal; a first interface circuit, coupled to the reception-transmission circuit, for performing following operations: transforming the at least one first WLAN signal to at least one first Ethernet frame and transmitting the at least one first Ethernet frame, when receiving the at least one first WLAN signal from the reception-transmission circuit; and transforming at least one second Ethernet frame to the at least one second WLAN signal and transmitting the at least one second WLAN signal to the reception-transmission circuit, when receiving the at least one second Ethernet frame; a second interface circuit, coupled to the first interface circuit, for performing following operations: transmitting the at least one first Ethernet frame, when receiving the at least one first Ethernet frame from the first interface circuit; and transmitting the at least one second Ethernet frame to the first interface circuit, when receiving the at least one second Ethernet frame; and a processing circuit, coupled to the second interface circuit, for performing following operations: transforming the at least one first Ethernet frame to the at least one first WLAN signal, when receiving the at least one first Ethernet frame from the second interface circuit; and transforming the at least one second WLAN signal to the at least one second Ethernet frame and transmitting the at least one second Ethernet frame to the second interface circuit, when obtaining the at least one second WLAN signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
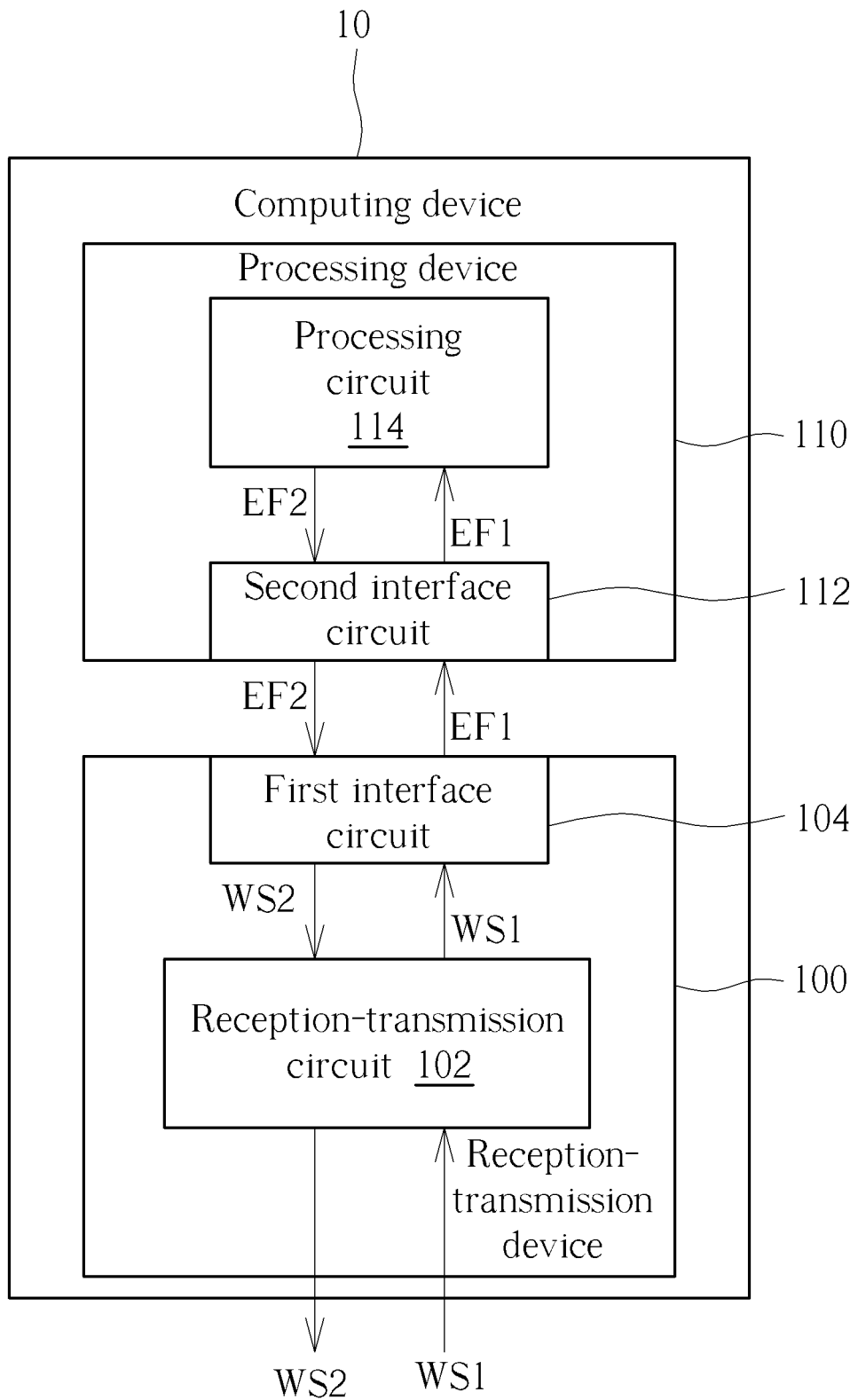
FIG. 1 is a schematic diagram of a computing device according to an example of the present invention.

FIG. 1 is a schematic diagram of a computing device 10 according to an example of the present invention. As shown in FIG. 1, the computing device 10 includes a reception-transmission device 100 and a processing device 110. The processing device 110 is coupled to the reception-transmission device 100. The reception-transmission device 100 includes a reception-transmission circuit 102 and a first interface circuit 104. The processing device 110 includes a second interface circuit 112 and a processing circuit 114. In one example, the computing device 10 may receive a Wireless Local Area Network (WLAN) signal WS1 from a WLAN and may transform the WLAN signal WS1 to an Ethernet frame EF1, or may transform an Ethernet frame EF2 to a WLAN signal WS2 and may transmit the WLAN signal WS2 to the WLAN.

In one example, the reception-transmission circuit 102 transmits the WLAN signal WS1 to the first interface circuit 104, when the reception-transmission circuit 102 receives the WLAN signal WS1. The first interface circuit 104 transforms the WLAN signal WS1 to the Ethernet frame EF1 and transmits the Ethernet frame EF1 to the second interface circuit 112, when the first interface circuit 104 receives the WLAN signal WS1. The second interface circuit 112 transmits the Ethernet frame EF1 to the processing circuit 114, when the second interface circuit 112 receives the Ethernet frame EF1 from the reception-transmission device 100. The processing circuit 114 transforms the Ethernet frame EF1 to the WLAN signal WS1, when the processing circuit 114 receives the Ethernet frame EF1.

In one example, the processing circuit 114 transforms the WLAN signal WS2 to the Ethernet frame EF2 and transmits the Ethernet frame EF2 to the second interface circuit 112, when the processing circuit 114 obtains the WLAN signal WS2. The second interface circuit 112 transmits the Ethernet frame EF2 to the first interface circuit 104, when the second interface circuit 112 receives the Ethernet frame EF2. The first interface circuit 104 transforms the Ethernet frame EF2 to the WLAN signal WS2 and transmits the WLAN signal WS2 to the reception-transmission circuit 102, when the first interface circuit 104 receives the Ethernet frame EF2. The reception-transmission circuit 102 transmits the WLAN signal WS2 to the WLAN, when the reception-transmission circuit 102 receives the WLAN signal WS2.

In the operation that the first interface circuit 104 transforms the WLAN signal WS1 to the Ethernet frame EF1, the first interface circuit 104 transforms the WLAN signal WS1 to a first frame (e.g., WLAN frame). Then, the first interface circuit 104 encapsulates the first frame according to an Ethernet Prefix, to generate the Ethernet frame EF1. In one example, the Ethernet Prefix is defined in (e.g., a header similar to header(s) in) Ethernet standards (e.g., 802.3) developed by the Institute of Electrical and Electronics Engineers (IEEE). In one example, the Ethernet Prefix includes at least one of a destination address, a source address, an Ethernet type or a protocol associated with in-house information. In one example, a size of the destination address includes (e.g., is) 6 bytes, a size of the source address includes (e.g., is) 6 bytes, a size of the Ethernet type includes (e.g., is) 2 bytes, or a size of the protocol associated with the in-house information includes (e.g., is) any number of bytes.

The operation that the first interface circuit 104 encapsulates the first frame according to the Ethernet Prefix to generate the Ethernet frame EF1 is stated as follows. First, the first interface circuit 104 generates at least one second frame according to a first comparison result of a first size of the first frame and a maximum receive unit (MRU) size. For example, the first interface circuit 104 determines (e.g., generates) the at least one second frame as the first frame (i.e., the first interface circuit 104 does not segment the first frame), when the first comparison result indicates that the first size is smaller (e.g., not greater) than the MRU size. The first interface circuit 104 segments the first frame to the at least one second frame, when the first comparison result indicates that the first size is greater than the MRU size. In one example, the MRU size is determined according to a maximum receive unit which can be received by a device for receiving the Ethernet frame EF1 (i.e., the processing device 110 in the present example).

Then, the first interface circuit 104 adds (e.g., appends) the Ethernet prefix to the at least one second frame, to generate at least one third frame. In addition, the first interface circuit 104 generates at least one fourth frame according to at least one second comparison result of at least one second size of the at least one third frame and a threshold. For example, the first interface circuit 104 pads the at least one third frame to the threshold (e.g., by using padding bits) to generate the at least one fourth frame, when the at least one second comparison result indicates that the at least one second size is smaller than the threshold. The first interface circuit 104 determines the at least one fourth frame as the at least one third frame (i.e., the first interface circuit 104 does not pad the at least one third frame), when the at least one second comparison result indicates that the at least one second size is greater than the threshold. In one example, the threshold is defined in Ethernet standards developed by the IEEE. For example, the threshold includes (e.g., is) 60 bytes.

Further, the first interface circuit 104 performs at least one cyclic redundancy check (CRC) of the at least one fourth frame, to generate at least one check result of the at least one CRC. The first interface circuit 104 generates the Ethernet frame EF1 according to the at least one fourth frame and the at least one check result. For example, the Ethernet frame EF1 is generated by adding the at least one check result after at least one fourth frame.

In the operation that the processing circuit 114 transforms the Ethernet frame EF1 to the WLAN signal WS1, the processing circuit 114 decapsulates the Ethernet frame EF1 (e.g., according to the Ethernet Prefix) to generate at least one fifth frame. Then, the processing circuit 114 transforms (e.g., and reconstruct) the at least one fifth frame to the WLAN signal WS1.

In the operation that the processing circuit 114 transforms the WLAN signal WS2 to the Ethernet frame EF2, the processing circuit 114 transforms the WLAN signal WS2 to a sixth frame. Then, the processing circuit 114 encapsulates the sixth frame to generate the Ethernet frame EF2 according to the Ethernet Prefix. The operation that the processing circuit 114 encapsulates the sixth frame to generate the Ethernet frame EF2 and the operation that the processing circuit 114 encapsulates the first frame to generate the Ethernet frame EF1 are the similar (e.g., same) operation, and is not repeated herein. It should be noted that, in the present example, the first interface circuit 104 is for receiving the Ethernet frame EF2. Thus, the MRU size is determined according to the maximum receive unit which can be received by the first interface circuit 104.

In the operation that the first interface circuit 104 transforms the Ethernet frame EF2 to the WLAN signal WS2, the first interface circuit 104 decapsulates the Ethernet frame EF2 (e.g., according to the Ethernet Prefix) to generate at least one seventh frame. Then, the first interface circuit 104 transforms (e.g., and reconstruct) the at least one seventh frame to the WLAN signal WS2.

Figure 2:
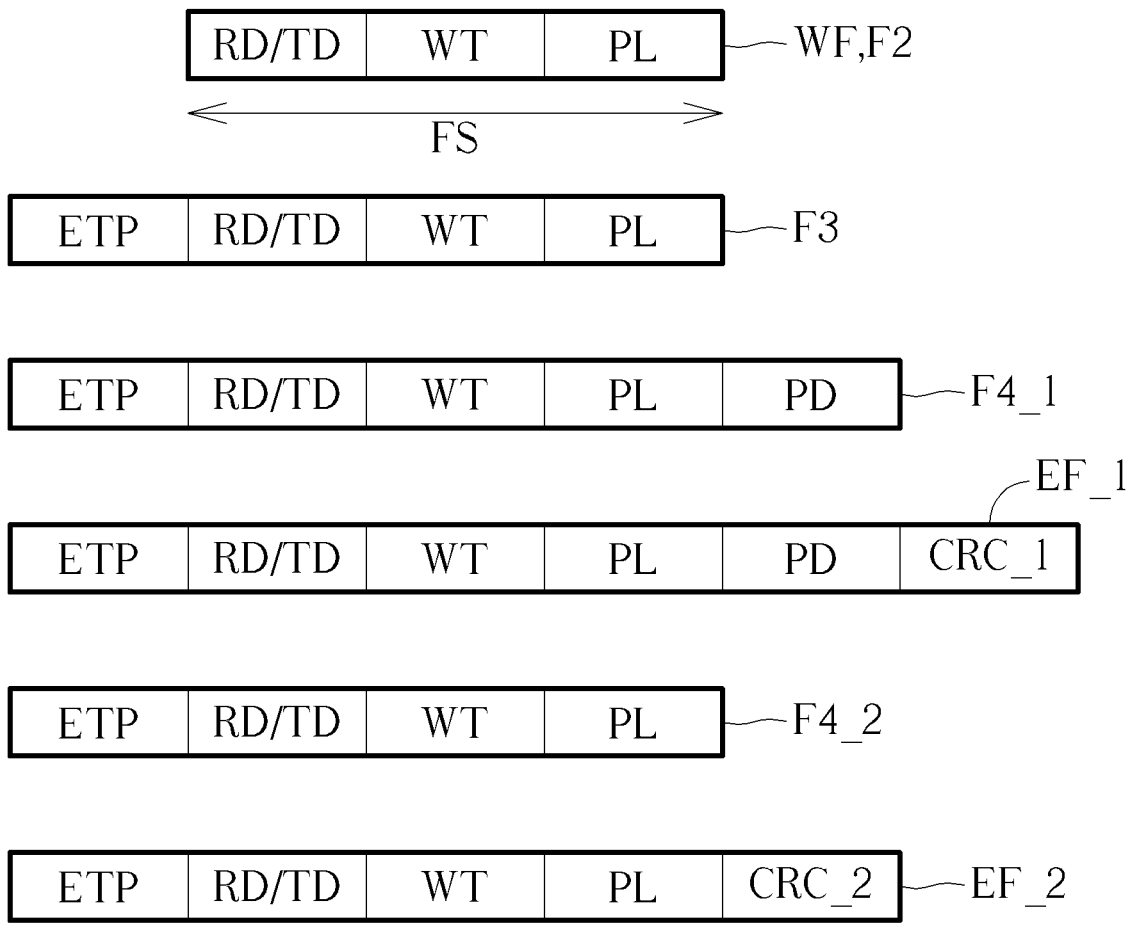
FIG. 2 is a schematic diagram of encapsulating a WLAN frame to generate an Ethernet frame according to an example of the present invention.

FIG. 2 is a schematic diagram of encapsulating a WLAN frame WF to generate an Ethernet frame EF_1 or EF_2 according to an example of the present invention. The WLAN frame WF includes a receive descriptor RD or a transmission descriptor TD, a WLAN type WT and a Payload PL. The WLAN type WT may be an Ethernet standard (e.g., 802.11) developed by the IEEE. The first interface circuit 104 or the processing circuit 114 determines a frame F2 as the WLAN frame WF (i.e., does not segment the WLAN frame WF), when a frame size FS of the WLAN frame WF is smaller than a MRU size which can be received by a device for receiving the WLAN frame WF (e.g., the processing device 110 in FIG. 1). The first interface circuit 104 or the processing circuit 114 adds the Ethernet prefix ETP to the frame F2, to generate a frame F3. In one example, the first interface circuit 104 or the processing circuit 114 pads the frame F3 to the threshold by using padding bits PD to generate a frame F4_1, when a size of the frame F3 is smaller than the threshold. The first interface circuit 104 or the processing circuit 114 performs a CRC of the frame F4_1, to generate a check result CRC_1 of the CRC. The first interface circuit 104 or the processing circuit 114 generates the Ethernet frame EF_1 by adding the check result CRC_1 after the frame F4_1. In one example, the first interface circuit 104 or the processing circuit 114 determines a frame F4_2 as the frame F3 (i.e., does not pad the frame F3 to the threshold) to generate a frame F4_2, when a size of the frame F3 is greater than the threshold. The first interface circuit 104 or the processing circuit 114 performs a CRC of the frame F4_2, to generate a check result CRC_2 of the CRC. The first interface circuit 104 or the processing circuit 114 generates the Ethernet frame EF_2 by adding the check result CRC_2 after the frame F4_2.

Figure 3:
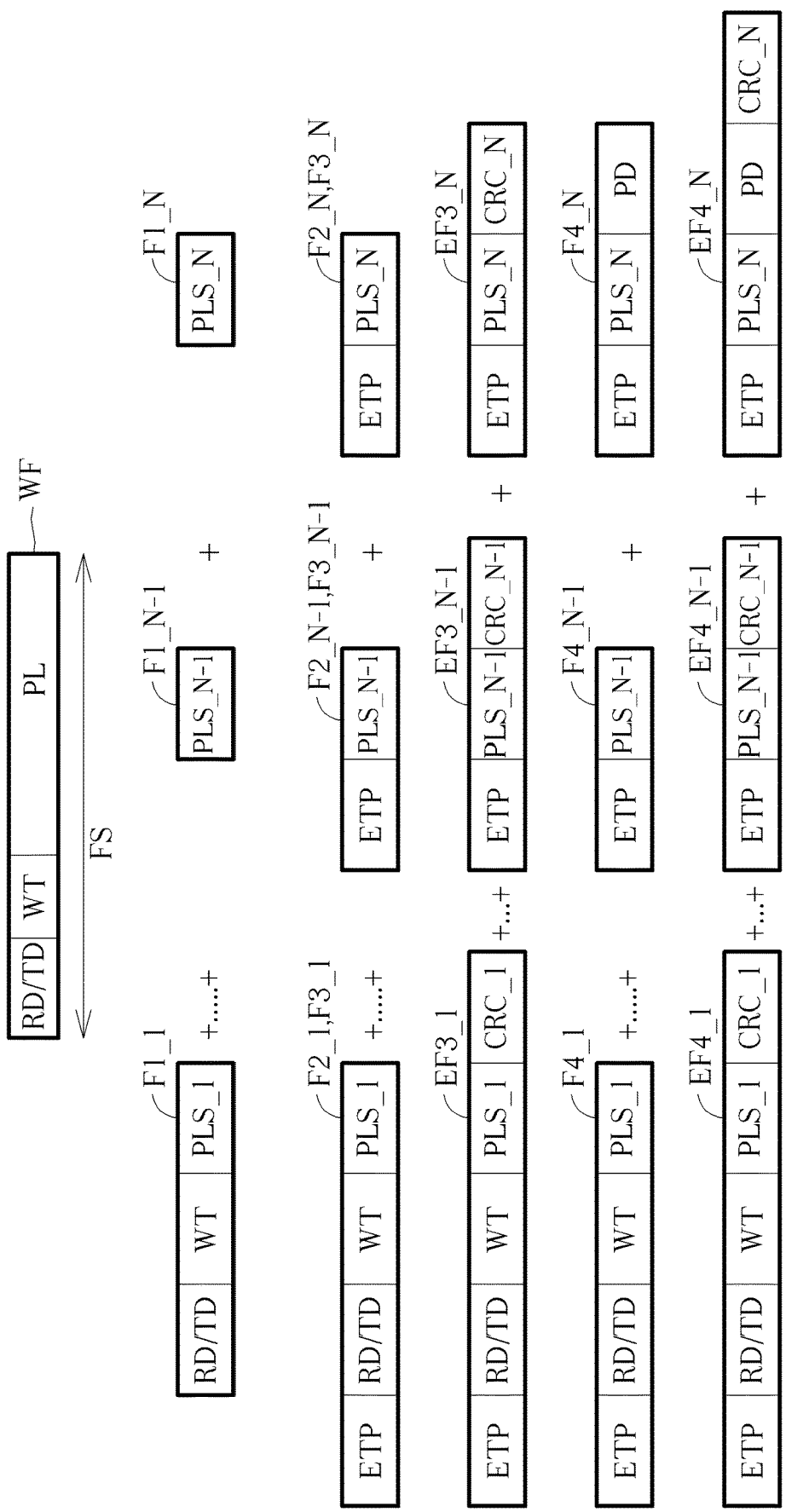
FIG. 3 is a schematic diagram of encapsulating a WLAN frame to generate an Ethernet frame according to an example of the present invention.

FIG. 3 is a schematic diagram of encapsulating a WLAN frame WF to generate Ethernet frames EF3_1-EF3_N or EF4_1-EF4_N according to an example of the present invention. The first interface circuit 104 or the processing circuit 114 segments the WLAN frame WF to frames F1_1-F1_N, when a frame size FS of the WLAN frame WF is greater than a MRU size which can be received by a device for receiving the WLAN frame WF (e.g., the processing device 110 in FIG. 1). The first interface circuit 104 or the processing circuit 114 adds the Ethernet prefix ETP to the frames F1_1-F1_N, to generate frames F2_1-F2_N, wherein the sizes of frames F2_1-F2_N−1 are all greater than the threshold. In one example, the first interface circuit 104 or the processing circuit 114 determines frames F3_1-F3_N as the frames F2_1-F2_N (i.e., does not pad the frames F2_1-F2_N to the threshold) to generate frames F3_1-F3_N, when a size of the frame F2_N is greater than the threshold. Then, the first interface circuit 104 or the processing circuit 114 performs CRCs of the frames F3_1-F3_N, to generate check results CRC_1-CRC_N of the CRCs. The first interface circuit 104 or the processing circuit 114 generates the Ethernet frames EF3_1-EF3_N by adding the check results CRC_1-CRC_N after the frames F3_1-F3_N. In one example, the first interface circuit 104 or the processing circuit 114 determines frames F4_1-F4_N−1 as the frames F2_1-F2_N−1 (i.e., does not pad the frames F2_1-F2_N−1 to the threshold), and pads the frame F2_N to the threshold by using padding bits PD to generate a frame F4_N, when a size of the frame F2_N is smaller than the threshold. Then, the first interface circuit 104 or the processing circuit 114 performs CRCs of the frame F4_1-F4_N, to generate check results CRC_1-CRC_N of the CRCs. The first interface circuit 104 or the processing circuit 114 generates the Ethernet frames EF4_1-EF4_N by adding the check results CRC_1-CRC_N after the frames F4_1-F4_N.

Figure 4:
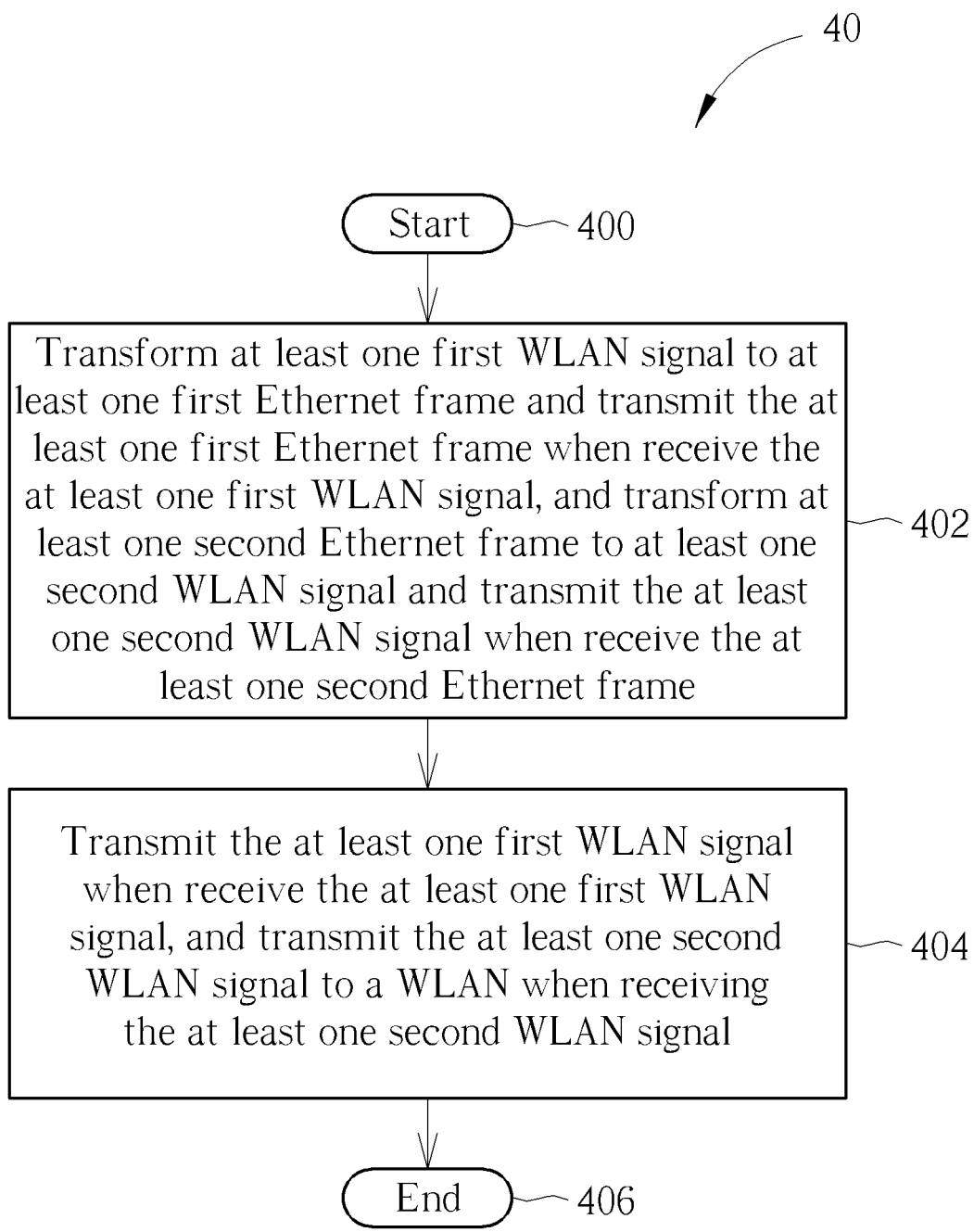
FIG. 4 is a flowchart of a process according to an example of the present invention.

Operations of the reception-transmission device 100 in the above examples can be summarized into a process 40 shown in FIG. 4. The process 40 includes the following steps:

Step 400: Start.

Step 402: Transform at least one first WLAN signal to at least one first Ethernet frame and transmit the at least one first Ethernet frame when receive the at least one first WLAN signal, and transform at least one second Ethernet frame to at least one second WLAN signal and transmit the at least one second WLAN signal when receive the at least one second Ethernet frame.

Step 404: Transmit the at least one first WLAN signal when receive the at least one first WLAN signal, and transmit the at least one second WLAN signal to a WLAN when receiving the at least one second WLAN signal.

Step 406: End.

Figure 5:
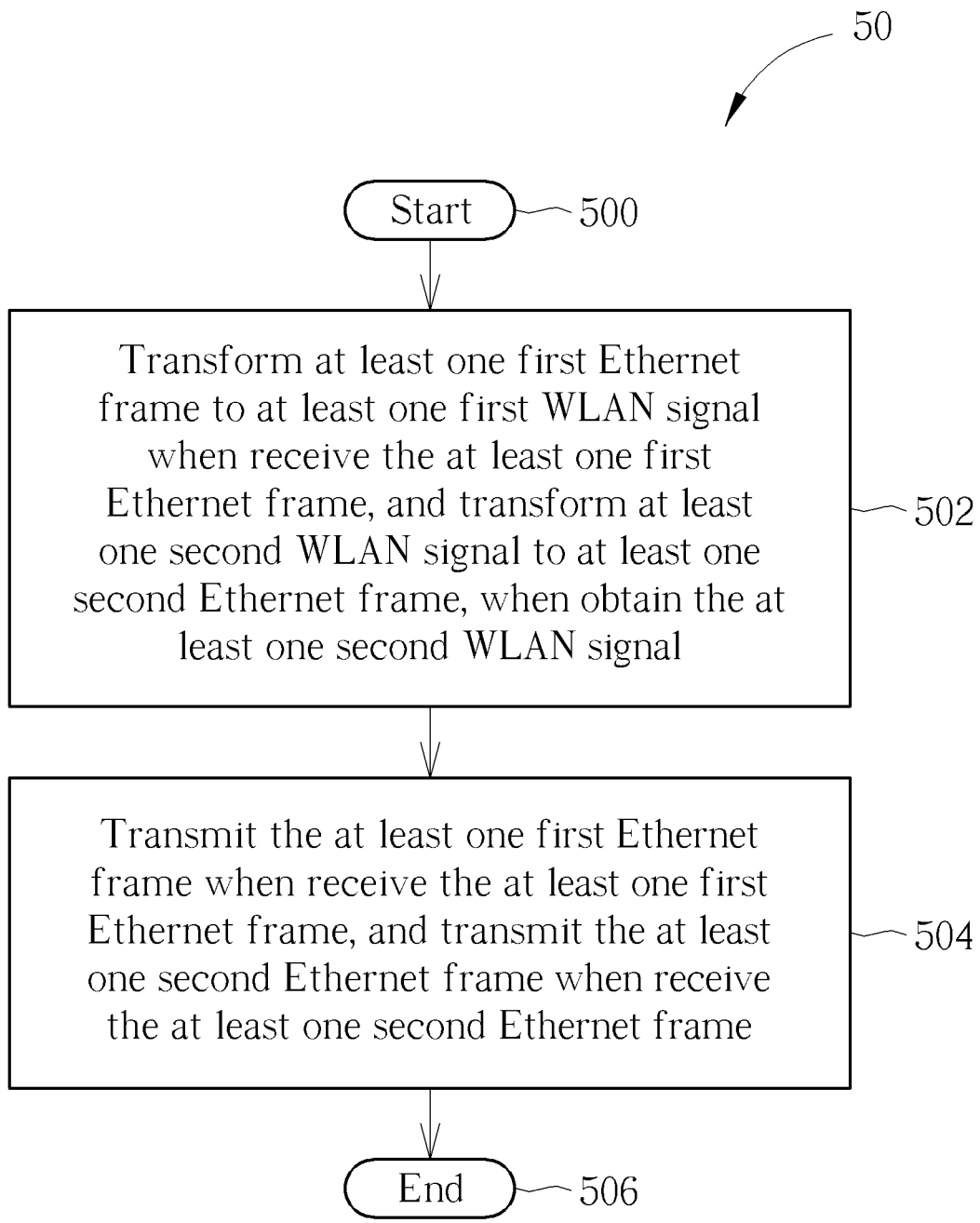
FIG. 5 is a flowchart of a process according to an example of the present invention.

Operations of the processing device 110 in the above examples can be summarized into a process 50 shown in FIG. 5. The process 50 includes the following steps:

Step 500: Start.

Step 502: Transform at least one first Ethernet frame to at least one first WLAN signal when receive the at least one first Ethernet frame, and transform at least one second WLAN signal to at least one second Ethernet frame, when obtain the at least one second WLAN signal.

Step 504: Transmit the at least one first Ethernet frame when receive the at least one first Ethernet frame, and transmit the at least one second Ethernet frame when receive the at least one second Ethernet frame.

Step 506: End.

Figure 6:
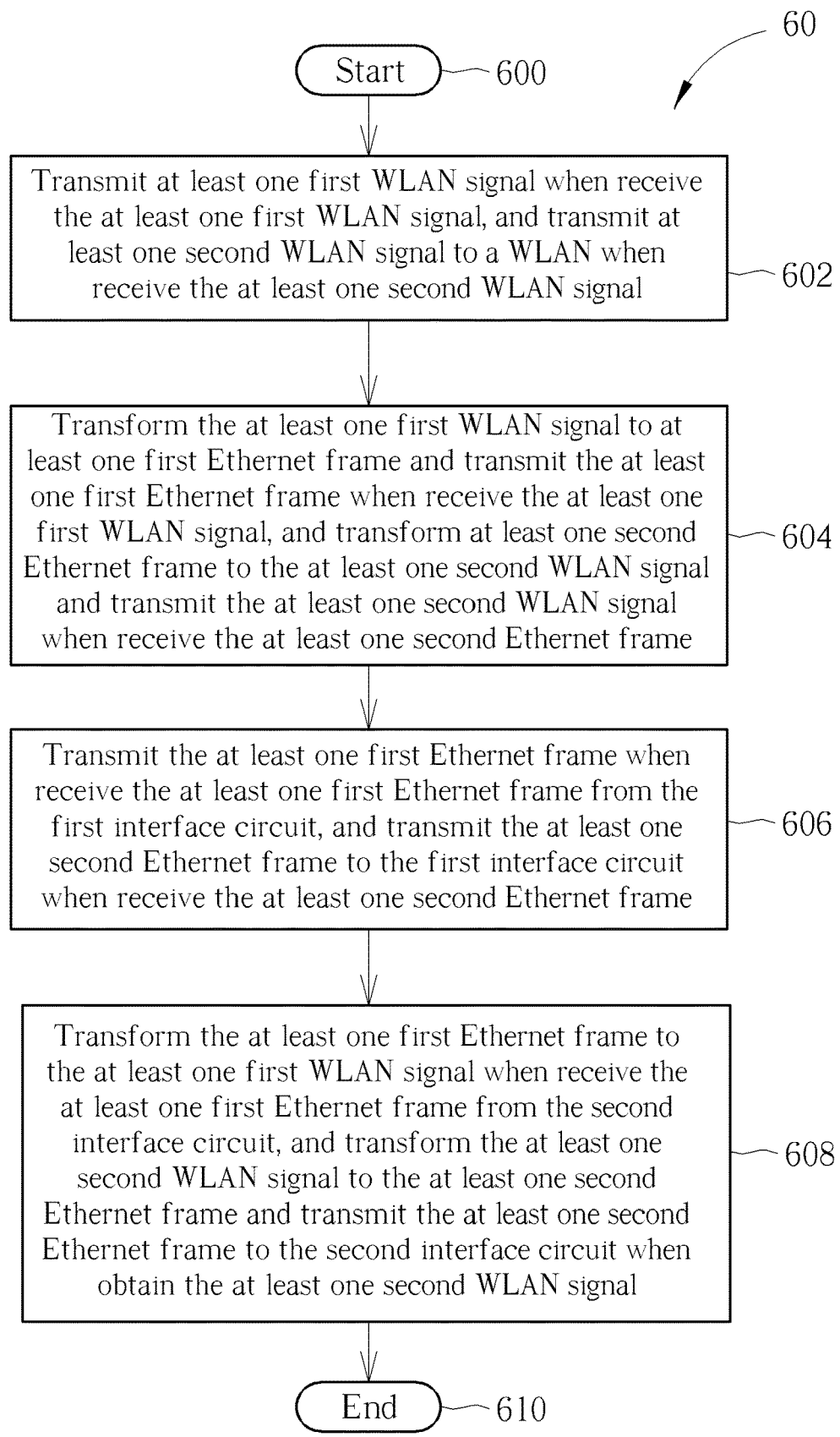
FIG. 6 is a flowchart of a process according to an example of the present invention.

Operations of the computing device 10 in the above examples can be summarized into a process 60 shown in FIG. 6. The process 60 includes the following steps:

Step 600: Start.

Step 602: Transmit at least one first WLAN signal when receive the at least one first WLAN signal, and transmit at least one second WLAN signal to a WLAN when receive the at least one second WLAN signal.

Step 604: Transform the at least one first WLAN signal to at least one first Ethernet frame and transmit the at least one first Ethernet frame when receive the at least one first WLAN signal, and transform at least one second Ethernet frame to the at least one second WLAN signal and transmit the at least one second WLAN signal when receive the at least one second Ethernet frame.

Step 606: Transmit the at least one first Ethernet frame when receive the at least one first Ethernet frame from the first interface circuit, and transmit the at least one second Ethernet frame to the first interface circuit when receive the at least one second Ethernet frame.

Step 608: Transform the at least one first Ethernet frame to the at least one first WLAN signal when receive the at least one first Ethernet frame from the second interface circuit, and transform the at least one second WLAN signal to the at least one second Ethernet frame and transmit the at least one second Ethernet frame to the second interface circuit when obtain the at least one second WLAN signal.

Step 610: End.

In the above examples, "obtain" can be replaced by "receive", "compute", "calculate" or "generate".

In the above examples, "determine" can be replaced by "compute", "calculate", "obtain", "generate" or "output". "According to" can be replaced by "via" or "by using". "size" can be replaced by "length".

It should be noted that realizations of the computing device 10 (and the reception-transmission device 100 and the processing device 110 of the computing device 10) are various. For example, the devices mentioned above may be integrated into one or more devices. In addition, the computing device 10 may be realized by hardware (e.g., circuit), software, firmware (known as a combination of a hardware device, computer instructions and data that reside as read-only software on the hardware device), an electronic system or a combination of the devices mentioned above, but is not limited herein.

To sum up, the present invention provides a device and a method of performing reception and transmission of WLAN signals. A WLAN signal received from a WLAN can be transformed to an Ethernet frame via an interface circuit of a reception-transmission device, and can be transmitted to a processing device. An Ethernet frame received from the processing device can be transformed to a WLAN signal via the interface circuit of the reception-transmission device, and can be transmitted to the WLAN. Thus, the reception-transmission device can connect to the processing device normally. The problem in the prior art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A reception-transmission device, comprising:
   an interface circuit, for performing following operations:
   transforming at least one first Wireless Local Area Network (WLAN) signal to at least one first Ethernet frame and transmitting the at least one first Ethernet frame, when receiving the at least one first WLAN signal; and
   transforming at least one second Ethernet frame to at least one second WLAN signal and transmitting the at least one second WLAN signal, when receiving the at least one second Ethernet frame; and
   a reception-transmission circuit, coupled to the interface circuit, for performing following operations:
   transmitting the at least one first WLAN signal to the interface circuit, when receiving the at least one first WLAN signal; and
   transmitting the at least one second WLAN signal to a WLAN, when receiving the at least one second WLAN signal.

2. The reception-transmission device of claim 1, wherein the operation of transforming the at least one first WLAN signal to the at least one first Ethernet frame comprises:
   transforming the at least one first WLAN signal to a first frame; and
   encapsulating the first frame according to an Ethernet Prefix, to generate the at least one first Ethernet frame.

3. The reception-transmission device of claim 1, wherein the Ethernet Prefix comprises at least one of a destination address, a source address, an Ethernet type or a protocol associated with in-house information.

4. The reception-transmission device of claim 2, wherein the operation of encapsulating the first frame according to the Ethernet Prefix, to generate the at least one first Ethernet frame comprises:
   generating at least one second frame according to a first comparison result of a first size of the first frame and a maximum receive unit (MRU) size;
   adding the Ethernet prefix to the at least one second frame, to generate at least one third frame;
   generating at least one fourth frame according to at least one second comparison result of at least one second size of the at least one third frame and a threshold;
   performing at least one cyclic redundancy check (CRC) of the at least one fourth frame, to generate at least one check result of the at least one CRC; and
   generating the at least one first Ethernet frame according to the at least one fourth frame and the at least one check result.

5. The reception-transmission device of claim 4, wherein the operation of generating the at least one second frame according to the first comparison result of the first size and the MRU size comprises:

determining the at least one second frame as the first frame, when the first comparison result indicates that the first size is smaller than the MRU size; and
segmenting the first frame to the at least one second frame, when the first comparison result indicates that the first size is greater than the MRU size.

6. The reception-transmission device of claim 4, wherein the operation of generating the at least one fourth frame according to the at least one second comparison result of the at least one second size and the threshold comprises:
   padding the at least one third frame to the threshold to generate the at least one fourth frame, when the at least one second comparison result indicates that the at least one second size is smaller than the threshold; and
   determining the at least one fourth frame as the at least one third frame, when the at least one second comparison result indicates that the at least one second size is greater than the threshold.

7. The reception-transmission device of claim 1, wherein the operation of transforming the at least one second Ethernet frame to the at least one second WLAN signal comprises:
   decapsulating the at least one second Ethernet frame, to generate at least one second frame; and
   transforming the at least one second frame to the at least one second WLAN signal.

8. A processing device, comprising:
   a processing circuit, for performing following operations:
   transforming at least one first Ethernet frame to at least one first Wireless Local Area Network (WLAN) signal, when receiving the at least one first Ethernet frame; and
   transforming at least one second WLAN signal to at least one second Ethernet frame, when obtaining the at least one second WLAN signal; and
   an interface circuit, coupled to the processing circuit, for performing following operations:
   transmitting the at least one first Ethernet frame to the processing circuit, when receiving the at least one first Ethernet frame; and
   transmitting the at least one second Ethernet frame to a reception-transmission device, when receiving the at least one second Ethernet frame.

9. The processing device of claim 8, wherein the operation of transforming the at least one first Ethernet frame to the at least one first WLAN signal comprises:
   decapsulating the at least one first Ethernet frame, to generate at least one first frame; and
   transforming the at least one first frame to the at least one first WLAN signal.

10. The processing device of claim 8, wherein the operation of transforming the at least one second WLAN signal to the at least one second Ethernet frame comprises:
    transforming the at least one second WLAN signal to a second frame; and
    encapsulating the second frame according to an Ethernet Prefix, to generate the at least one second Ethernet frame.

11. The processing device of claim 10, wherein the Ethernet Prefix comprises at least one of a destination address, a source address, an Ethernet type or a protocol associated with in-house information.

12. The processing device of claim 10, wherein the operation of encapsulating the second frame according to the Ethernet Prefix, to generate the at least one second Ethernet frame comprises:

generating at least one third frame according to a first comparison result of a first size of the second frame and a maximum receive unit (MRU) size;

adding the Ethernet prefix to the at least one third frame, to generate at least one fourth frame;

generating at least one fifth frame according to at least one second comparison result of at least one second size of the at least one fourth frame and a threshold;

performing at least one cyclic redundancy check (CRC) of the at least one fifth frame, to generate at least one check result of the at least one CRC; and generating the at least one second Ethernet frame according to the at least one fifth frame and the at least one check result.

13. The processing device of claim 12, wherein the operation of generating the at least one third frame according to the first comparison result of the first size and the MRU size comprises:

determining the at least one third frame as the second frame, when the first comparison result indicates that the first size is smaller than the MRU size; and segmenting the second frame to the at least one third frame, when the first comparison result indicates that the first size is greater than the MRU size.

14. The processing device of claim 12, wherein the operation of generating the at least one fifth frame according to the at least one second comparison result of the at least one second size and the threshold comprises:

padding the at least one fourth frame to the threshold to generate the at least one fifth frame, when the at least one second comparison result indicates that the at least one second size is smaller than the threshold; and determining the at least one fifth frame as the at least one fourth frame, when the at least one second comparison result indicates that the at least one second size is greater than the threshold.

15. A computing device, comprising:

a reception-transmission circuit, for performing following operations:

transmitting at least one first Wireless Local Area Network (WLAN) signal, when receiving the at least one first WLAN signal; and transmitting at least one second WLAN signal to a WLAN, when receiving the at least one second WLAN signal;

a first interface circuit, coupled to the reception-transmission circuit, for performing following operations:

transforming the at least one first WLAN signal to at least one first Ethernet frame and transmitting the at least one first Ethernet frame, when receiving the at least one first WLAN signal from the reception-transmission circuit; and transforming at least one second Ethernet frame to the at least one second WLAN signal and transmitting the at least one second WLAN signal to the reception-transmission circuit, when receiving the at least one second Ethernet frame;

a second interface circuit, coupled to the first interface circuit, for performing following operations:

transmitting the at least one first Ethernet frame, when receiving the at least one first Ethernet frame from the first interface circuit; and transmitting the at least one second Ethernet frame to the first interface circuit, when receiving the at least one second Ethernet frame; and a processing circuit, coupled to the second interface circuit, for performing following operations:

transforming the at least one first Ethernet frame to the at least one first WLAN signal, when receiving the at least one first Ethernet frame from the second interface circuit; and transforming the at least one second WLAN signal to the at least one second Ethernet frame and transmitting the at least one second Ethernet frame to the second interface circuit, when obtaining the at least one second WLAN signal.

16. The computing device of claim 15, wherein the operation of transforming the at least one second Ethernet frame to the at least one second WLAN signal comprises:

decapsulating the at least one second Ethernet frame, to generate at least one first frame; and transforming the at least one first frame to the at least one second WLAN signal.

17. The computing device of claim 15, wherein the operation of transforming the at least one first Ethernet frame to the at least one first WLAN signal comprises:

decapsulating the at least one first Ethernet frame, to generate at least one second frame; and transforming the at least one second frame to the at least one first WLAN signal.

18. The computing device of claim 15, wherein the operation of transforming the at least one second WLAN signal to the at least one second Ethernet frame comprises:

transforming the at least one second WLAN signal to a third frame; and encapsulating the third frame according to a first Ethernet Prefix, to generate the at least one second Ethernet frame.

19. The computing device of claim 15, wherein the operation of transforming the at least one first WLAN signal to the at least one first Ethernet frame comprises:

transforming the at least one first WLAN signal to a fourth frame; and encapsulating the fourth frame according to a second Ethernet Prefix, to generate the at least one first Ethernet frame.

20. The computing device of claim 19, wherein the second Ethernet Prefix comprises at least one of a destination address, a source address, an Ethernet type or a protocol associated with in-house information.

* * * * *